United States Patent Office 3,464,966
Patented Sept. 2, 1969

3,464,966
CHLORINATED POLYMERS
Norman Leonard Watson, Runcorn, Cheshire, England, assignor to Imperial Chemical Industries Limited, London, England, a corporation of Great Britain
No Drawing. Filed Nov. 30, 1966, Ser. No. 597,893
Claims priority, application Great Britain, Dec. 24, 1965, 54,842/65
Int. Cl. C08f *47/00, 29/14;* C08d *13/00*
U.S. Cl. 260—94.7                                6 Claims

ABSTRACT OF THE DISCLOSURE

Chlorinated polymers selected from rubber, polyisoprene and polyethylene are separated from a solution thereof in carbon tetrachloride by precipitation in an agitated mixture of one part of carbon tetrachloride and 0.65 to 3 parts of methanol while adding methanol to maintain these critical limits.

---

The persent invention relates to the manufacture of chlorinated polymers. More particularly it relates to the isolation of chlorinated polymers from their solutions in carbon tetrachloride.

It is known to improve the film-forming properties of certain organic polymers, notably natural rubber, synthetic polyisoprene, polyethylene and polypropylene, by submitting them to chlorination while dissolved in a chlorine-resistant solvent. The solvent most generally employed is carbon tetrachloride and it is known to isolate the chlorinated polymer product from its solution in carbon tetrachloride either by distilling off the solvent, for example by steam distillation, or by mixing the solution with a solvent which is miscible with carbon tetrachloride but which is a non-solvent for the chlorinated polymer. Thus according to British patent specification No. 430,906 chlorinated rubber may be separated as a solid from its solution in carbon tetrachloride by contacting the solution with an excess of a liquid precipitant, preferably methanol, maintained in a state of agitation, and then preferably washing the precipitated solid with a further quantity of methanol.

The method of the said British patent yields a coarse powder product which contains 0.5–2% by weight of residual carbon tetrachloride, and the product obtained by steam distillation of a chlorinated rubber solution is a fibrous solid of low packing density which requires a ball-milling operation to reduce it to fine particles and contains as much as 5% carbon tetrachloride. This residual solvent is very tenaciously held by the coarse polymer particles. For instance, repeated washing with methanol will not reduce the 5% figure of the steam-distilled material below about 3%. Although for many years carbon tetrachloride contents of this order have been accepted in chlorinated polymers, with expanding uses of the polymers requirements have become more stringent since corrosion of equipment handling solutions of the polymers in other solvents can occur when any significant amount of the somewhat unstable carbon tetrachloride remains in the polymer.

We have now found that a chlorinated polymer can be obtained in a fine powder form of high packing density requiring no further milling treatment for size reduction from a solution of the polymer in carbon tetrachloride by employing specific mixtures of methanol and carbon tetrachloride as the precipitating agent and that futrhermore by combining the precipitation step with a washing procedure a fine powder product containing less than 0.05% by weight of carbon tetrachloride can be obtained.

According to the present invention, therefore, a method for the separation of a chlorinated polymer from its solution in carbon tetrachloride comprises feeding the said solution into an agitated mixture of one part of carbon tetrachloride and 0.65–3 parts of methanol by volume and at the same time adding methanol to the said mixture so as to maintain the volume ratio of carbon tetrachloride to methanol in the mixture within the same limits.

In general it is preferred that in the above defined ratios the minimum figure for the methanol proportion should be 0.8 part. We have found, furthermore, that when the methanol proportion is near the upper end of the above defined range the packing density of the precipitated polymer is very high and the polymer cannot be easily washed free from residual carbon tetrachloride. We prefer therefore that the maximum figure for the methanol proportion in the above defined mixture should be 2 parts.

The most preferred ratio of carbon tetrachloride:methanol in the precipitant solvent mixture varies somewhat according to the chemical type of polymer and the molecular weight of the polymer. Thus for low molecular weight chlorinated rubber the most preferred ratio is in the range one part of carbon tetrachloride:0.8–1.25 parts of methanol by volume. For high molecular weight chlorinated rubber the preferred ratio is 1:0.8. The preferred ratios for chlorinated synthetic polyisoprene are the same as for chlorinated natural rubber. For low molecular weight chlorinated polyethyelne the preferred range is one part of carbon tetrachloride:1–1.5 parts of methanol by volume and for high molecular weight chlorinated polyethylene the preferred range is 1:1 to 1:2.

By a low molecular weight polymer we mean throughout this specification a polymer which has a solution viscosity of 5–20 centipoise determined at 25° C. on a 20% w./w. solution of the polymer in toluene. By a high molecular weight polymer we mean one having a solution viscosity of about 125 centipoise under the same conditions.

The method according to the invention may be employed for the separation from solution of the chlorinated polymers which are usually produced in carbon tetrachloride solution, for example chlorinated natural rubber, chlorinated synthetic ployisoprene, chlorinated polyethylene, chlorinated polypropylene and chlorinated ethylene/propylene copolymers and terpolymers with other monomers.

Separation of a chlorinated polymer from its solution in carbon tetrachloride according to the broad scope of the invention as defined hereinbefore provides a product in the form of a powder, which may be separated from the bulk of the solvent mixture by a filtration step. By working under the more narrowly defined conditions of limiting the methanol concentration in the precipitant mixture to a maximum of 2 parts by volume to one part of carbon tetrachloride the packing density of the product is controlled so that, after separation the fine powder precipitate from the bulk of the solvent mixture by filtration, according to a further feature of the invention the isolated solid may be washed with methanol until the residual carbon tetrachloride content has been reduced to the desired level, for instance less than 0.05% by weight.

When a chlorinated polymer is separated from solution in carbon tetrachloride in the above described manner according to the invention precipitation may be incomplete, for instance only about 99% complete, particularly when the methanol content of the precipitant mixture is near the lower end of the stated range. In order to ensure substantially 100% precipitation of the polymer and also to assist the final filtration we prefer therefore to carry out a second precipitation step before filtration, wherein the slurry of polymer in the mixed solvents obtained in the first precipitation step is fed into an agitated mixture of carbon tetrachloride and methanol containing a higher proportion of methanol than the first precipitant mixture and having a composition lying in the range one part of carbon tetrachloride:2–4 parts of methanol by volume and at the same time methanol is fed into the second precipitant mixture to maintain the volume ratio of carbon tetrachloride to methanol in the mixture within the same limits. The precipitated polymer may then be recovered from the slurry thereby obtained by filtration and may be washed with methanol to remove residual carbon tetrachloride and dried, for instance in an air-oven at 70° C.

The precipitation step may be in general be carried out at ambient temperature i.e. up to about 25° C. However, with high molecular weight polymers there is an advantage in working at temperatures down to about −20° C., since at lower temperatures there is more latitude in the choice of solvent ratios which yield the product in the best fine powder form. For instance for the separation of high molecular weight chlorinated polyethylene from solution we prefer to carry out a two-stage precipitation at a temperature of about −20° C. in both stages.

The method according to the invention may be carried out batchwise, or if desired it may be conducted in a continuous manner, for instance in the manner of the following examples:

Example 1

A mixture of one volume of carbon tetrachloride and one volume of methanol was placed in a first precipitation vessel fitted with a stirrer, and a mixture of 0.5 volume of carbon tetrachloride and 1.5 volumes of methanol was placed in a second precipitation vessel fitted with a stirrer. Working at ambient temperature, a solution of chlorinated rubber (20 centipoise solution viscosity grade as hereinbefore defined) in carbon tetrachloride containing about 15% by weight of the polymer was fed at the rate of one volume per hour through one inlet pipe into the agitated mixture in the first vessel while one volume per hour of methanol was introduced through a second inlet pipe. A suspension of precipitated polymer in the mixed solvents (2 volumes per hour) was removed continuously from the first precipation vessel through an overflow pipe into the agitated mixture of solvents in the second precipitation vessel by way of one inlet pipe while 2 volumes per hour of methanol were introduced through a second inlet pipe. A suspension of precipitated polymer in the mixed solvents (4 volumes per hour) was removed continuously from the second precipitation vessel by way of an overflow pipe to a filter. Each hourly batch of polymer collected on the filter was washed with methanol to remove residual carbon tetrachloride and the washed product was freed from residual methanol by drying in an air-oven at 70° C. The product was a fine powder of packing density 428 g./l. containing less than 0.05% by weight of carbon tetrachloride.

Example 2

In the manner of Example 1, chlorinated polyethylene of 125 centipoise solution viscosity grade was separated from a solution in carbon tetrachloride containing about 15% by weight of the polymer by feeding one volume per hour of the solution to the first precipitation vessel, the volume ratio of carbon tetrachloride: methanol being in this case 1:2 in the first vessel and 1:3 in the second vessel and the methanol feeds being adjusted so as to maintain these concentrations. In this case also the precipitation vessels were refrigerated and the methanol feeds were pre-cooled to maintain a temperature of −20° C. in the vessels. The dried product obtained was a fine powder of packing density 460 g./l. containing less than 0.05% by weight of carbon tetrachloride.

Example 3

Various viscosity grades of chlorinated synthetic polyisoprene as shown is the following table and a low viscosity grade of chlorinated polyethylene were continuously separated from their solutions in carbon tetrachloride (24 hours for each run) by a two-stage precipitation process according to the invention using a glass precipitation vessel 9 inches diameter and aproximately 10 litres working volume fitted with a stirrer in each stage. The precipitation process was operated at ambient temperature in the manner of Example 1 but with the carbon tetrachloride:methanol ratios and the methanol feed rates shown in the table for each vessel. In each run 37.5 litres per hour of the polymer solution in carbon tetrachloride were fed to the first precipitation vessel. The suspension of polymer in the mixed solvents was removed continuously from the second precipitation vessel to a holding vessel and at the end of the 24-hour run the whole batch was passed from the holding vessel to a pressure filter to remove the bulk of the mixed solvents and the separated polymer was then washed on the filter with approximately 3,200 litres of methanol to remove residual carbon tetrachloride and was freed from residual methanol by drying in an air-oven at 70° C. The methanol passed through the filter during washing was collected in a holding vessel and was then fed back to the first and second precipitation stages over 24 hours as necessary to separate another 24-hour run of polymer from solution, without first removing from it the small amount of carbon tetrachloride washings which it contained. The quantity of methanol employed for washing was therefore made sufficient to deal with another 24-hour precepitation run after allowing for the amount retained in the filter cake, although a smaller quantity would have been sufficient to achieve adequate washing of the polymer.

| Polymer concentration in CCl₄ solution, percent w./w. | Polymer viscosity, grade centipoise | 1st precipitation vessel | | 2nd precipitation vessel | | Dried product | |
|---|---|---|---|---|---|---|---|
| | | CCl₄: Methanol volume ratio | Methanol feed, litres/hour | CCl₄: methanol volume ratio | Methanol feed, litres/hour | Residual CCl₄, percent w./w. | Packing density, g./l. |
| CHLORINATED SYNTHETIC POLYISOPRENE | | | | | | | |
| 17 | 5 | 1:1 | 37.5 | 1:3 | 75 | <0.05 | 462 |
| 19 | 10 | 1:1.25 | 46.9 | 1:3 | 65.6 | <0.05 | 458 |
| 13 | 20 | 1:0.8 | 30 | 1:3 | 82.5 | <0.05 | 420 |
| 8.6 | 125 | 1:0.8 | 30 | 1:3 | 82.5 | <0.05 | 386 |
| CHLORINATED POLYETHYLENE | | | | | | | |
| 17 | 20 | 1:1 | 37.5 | 1:3 | 75 | <0.05 | 599 |

What we claim is:

1. A method for the separation of a chlorinated polymer selected from the group consisting of chlorinated natural rubber, chlorinated synthetic polyisoprene and chlorinated polyethylene from its solution in carbon tetrachoride which comprises feeding the said solution into an agitated mixture of one part of carbon tetrachloride and 0.65–3 parts of methanol by volume maintained at −20° to 25° C. and at the same time adding methanol to the said mixture so as to maintain the volume ratio of carbon tetrachloride to methanol in the mixture within the same limits.

2. A method of according to claim 1 wherein the slurry of polymer in a mixture of carbon tetrachloride and methanol obtained is fed into an agitated mixture of carbon tetrachloride and methanol containing a higher proportion of methanol than the first precipitant mixture and having a composition lying in the range one part of carbon tetrachloride to 2-4 parts of methanol by volume and at the same time methanol is fed into the second precipitant mixture so as to maintain the volume ratio of carbon tetrachloride to methanol in the mixture within the same range.

3. A method according to claim 1 wherein the proportion of methanol in the first precipitant mixture is not less than 0.8 part of methanol to one part of carbon tetrachloride by volume.

4. A method according to claim 1 wherein the proportion of methanol in the first precipitant mixture is not more than 2 parts of methanol to one part of carbon tetrachloride by volume.

5. A method according to claim 4 wherein the slurry of polymer in a mixture of carbon tetrachloride and methanol obtained from the first or second precipitation step is submitted to filtration and the separated polymer is then washed with methanol to remove residual carbon tetrachloride.

6. A method according to claim 5 wherein the washing is continued until the polymer contains less than 0.05% of carbon tetrachloride calculated on the dry weight of the polymer.

References Cited

FOREIGN PATENTS 978,244   12/1964   Great Britain.
472,502   3/1951    Canada.

JOSEPH L. SCHOFER, Primary Examiner

W. F. HAMROCK, Assistant Examiner

U.S. Cl. X.R.

260—94.9, 96, 772